United States Patent [19]

Vaughan et al.

[11] 4,176,090

[45] Nov. 27, 1979

[54] PILLARED INTERLAYERED CLAY MATERIALS USEFUL AS CATALYSTS AND SORBENTS

[75] Inventors: David E. W. Vaughan, Columbia; Roger J. Lussier; John S. Magee, Jr., both of Ellicott City, all of Md.

[73] Assignee: W. R. Grace & Co., New York, N.Y.

[21] Appl. No.: 885,408

[22] Filed: Mar. 10, 1978

Related U.S. Application Data

[63] Continuation-in-part of Ser. No. 805,672, Jun. 13, 1977, abandoned, which is a continuation-in-part of Ser. No. 704,358, Jul. 12, 1976, abandoned, which is a continuation-in-part of Ser. No. 633,053, Nov. 18, 1975, abandoned.

[51] Int. Cl.² ........................................ B01J 29/06
[52] U.S. Cl. .......................... 252/455 Z; 252/455 R; 423/327; 423/328
[58] Field of Search ............... 252/442, 455 R, 455 Z; 423/327, 328

[56] References Cited

U.S. PATENT DOCUMENTS

| | | | |
|---|---|---|---|
| 3,887,454 | 6/1975 | Hickson | 252/455 R |
| 3,909,861 | 10/1975 | Reinhardt et al. | 252/442 X |
| 4,060,480 | 11/1977 | Reed et al. | 208/111 |

*Primary Examiner*—Carl Dees
*Attorney, Agent, or Firm*—Arthur P. Savage

[57] ABSTRACT

Stable pillared interlayered clay compositions are prepared by reacting smectite type clays with polymeric cationic hydroxy metal complexes of metals such as aluminum, zirconium, and/or titanium. These novel interlayered clay compositions which possess substantial surface area in pores of less than 30 Å in diameter are used as catalysts, catalytic supports, and sorbents.

21 Claims, 3 Drawing Figures

PILLARED INTERLAYERED CLAY MATERIALS USEFUL AS CATALYSTS AND SORBENTS

This application is a continuation-in-part of our application Ser. No. 805,672 filed June 13, 1977, now abandoned which is a continuation-in-part of application Ser. No. 704,358 filed July 12, 1976, now abandoned, which is a continuation-in-part of application Ser. No. 633,053 filed Nov. 18, 1975, now abandoned.

The present invention relates to novel clay derived compositions, and more specifically to interlayered derivatives of smectite type minerals (layered clays) which possess considerable internal micropore volume and have useful catalytic and adsorbent properties.

Layered naturally occurring and synthetic smectites such as bentonite, montmorillonites and chlorites may be visualized as a "sandwich" comprising two outer layer of silicon tetrahedra and an inner layer of alumina octahedra. These "sandwiches" or platelets are stacked one upon the other to yield a clay particle. Normally this yields a repeating structure every nine angstroms or thereabouts. Much work has been done to demonstrate that these platelets can be separated further, i.e. interlayered by insertion of various polar molecules such as water, ethylene glycol, various amines, etc. and that the platelets can be separated by as much as 30 to 40 Å. Furthermore, prior workers have similarly prepared phosphated or alumino-phosphated interlayered clays as low temperature traps for slow release fertilizer. The interlayered clays thus far prepared from naturally occurring smectites are not suitable for general adsorbent and catalytic applications due to the fact they tend to collapse when subjected to high temperatures.

DESCRIPTION OF THE PRIOR ART

U.S. Pat. Nos. 3,803,026; 3,844,979; 3,887,454; and 3,892,655 describe layered clay-like materials and the process for using these materials. The layered clay materials are prepared from synthetic solutions of silica, alumina and magnesia salts. The final product has a composition similar to the composition of the clays covered in the instant application. The product of the instant application differs from the disclosed products, in that it contains non-exchangeable alumina between the sandwiches and an interlayer spacing greater than about 6 Å is characteristic of an anhydrous product.

U.S. Pat. No. 3,275,757 also discloses synthetic layered type silicate materials as does U.S. Pat. No. 3,252,889. U.S. Pat. No. 3,586,478 discloses the method of producing synthetic swelling clays of the hectorite type by forming an aqueous slurry from a water soluble magnesium salt, sodium silicate, sodium carbonate or sodium hydroxide and materials containing lithium and flouride ions. The slurry is then hydrothermally treated to crystallize a synthetic clay-like material.

U.S. Pat. Nos. 3,666,407 and 3,671,190 describe other methods of preparing clay-like materials. All of these synthetic clays are acceptable raw materials for use in the instant invention in place of the naturally occurring clays. However, by virtue of ready availability of large quantities at low prices, the natural clays will generally be prepared for use in the present invention.

U.S. Pat. Nos. 3,798,177 and 4,060,480 disclose the preparation of hydroxy-aluminum modified smectite clays wherein a gibbsite-like layer is formed between the crystalline layers of the clay. The gibbsite-like layer is characterized by a 14 Å spacing, is continuous and does not substnatially increase the internal pore volume (micropore characteristics) of the modified clay material.

The present invention distinguishes over the prior art in that it is concerned with a novel method for modifying known smectite type minerals in such a way as to produce a substantial micropore structure in the minerals and thereby yield novel catalytic and sorbent products having utility in the petroleum, chemical and related industries. The resultant properties may be viewed as being more characteristic of crystalline zeolites than clays.

BRIEF DESCRIPTION OF THE INVENTION

The present invention relates to the preparation of novel "pillared" interlayered clays which are obtained by reacting smectite type clays with polymeric cationic hydroxy metal complexes. The pillared interlayered clays of our invention possess a unique internal micropore structure which is established by introducing discrete/non-continuous inorganic oxide particles, i.e. pillars, having a length of about 6 to 16 Å between the clay layers. These pillars serve to prop open the clay layers upon removal of water and form an internal interconnected micropore structure throughout the interlayer in which the majority of the pores are less than about 30 Å in diameter.

More specifically, we have found that thermally stable interlayered clays which have an interlayer spacing of up to about 16 Å and greater than 50% of its surface area in pores of less than 30 Å in diameter may be prepared by reacting a naturally occurring or synthetic smectite type clay with a polymeric cationic hydroxy metal complex, such as aluminum chlorohydroxide complexes ("chlorhydrol"), and heating to convert the hydrolyzed polymer complex into an inorganic oxide.

A more clear understanding of our invention may be obtained from the following detailed description, specific examples, and drawing wherein.

Figure 1:
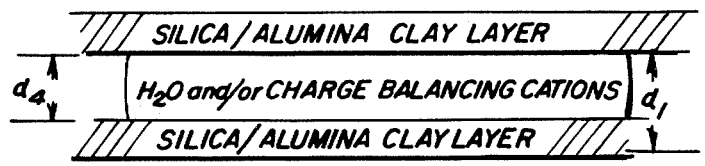
FIG. 1 represents a cross-sectional view of the structure of a typical smectite type clay which may be used to prepare the novel interlayered clay products of our invention.

To obtain the novel pillared interlayer clay products of our invention the following general procedure may be used:

(1) A smectite clay is mixed with an aqueous solution of a polymeric cationic hydroxy metal complex such as aluminum chlorhydrol, in amounts wherein the weight ratio of clay to metal complex solution is from 1:2 to 1000. The metal complex solution will preferably contain from about 1 to 40% by weight solids in a suitable liquid medium such as water.

(2) The mixture of clay and metal complex is maintained at a temperature of about 5° to 200° C. for a period of 0.1 to 4.0 hours.

(3) The reacted clay solids are recovered and heated at a temperature of from about 200° to 700° C. to decompose the hydrolyzed metal complex to a pillar of inorganic oxide.

The clays used as starting materials in the present invention are the group of minerals commonly called smectites and represented by the general formula:

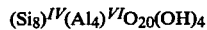

where the IV designation indicates an ion coordinated to four other ions, and VI designates an ion coordinated to six other ions. The IV coordinated ion is commonly $Si^{4+}$, $Al^{3+}$ and/or $Fe^{3+}$, but could also include several other four coordinate ions (e.g., $P^{5+}$, $B^{3+}$, $Ge^{4+}$, $Be^{2+}$, etc.). The VI coordinated ion is commonly $Al^{3+}$ or $Mg^{2+}$, but could also include many possible hexacoordinate ions (e.g. $Fe^{3+}$, $Fe^{2+}$, $Ni^{2+}$, $Co^{2+}$, $Li^+$, etc.). The charge deficiencies created by the various substitutions into these four and six coordinate cation positions, are balanced by one or several cations located between the structural units. Water may also be occluded between these structural units, bonded either to the structure itself, or to the cations as a hydration shell. When dehydrated, the above structural units have a repeat distance of about 9 to 12 Å, measured by X-ray diffraction. Typical commercially available clays include montmorillonite, bentonite, beidellite and hectorite.

The inorganic metal polymers used in the practice of the present invention are generally known as basic aluminum, zirconium, and/or titanium complexes which are formed by the hydrolysis of aluminum, zirconium, and/or titanium salts. While there is some disagreement on the nature of the species present in hydrolyzed metal complex solutions (or suspensions), it is generally believed that these mixtures contain highly charged cationic complexes with several metal ions being complexed.

The inorganic aluminum polymers used to prepare our novel pillared interlayered clay compositions comprise solutions of discrete polymer particles having a generally spherical shape and a diameter of about 8 Å and in which the aluminum atoms are present in the tetrahedral coordinated form to an extent of up to about 10% as determined by NMR measurement as shown by Rausch and Bale, in J. Chem. Phys. 40 (11), 3391 (1964), the remainder being octahedral coordinated. The typical hydroxy-aluminum polymers previously used to produce uniform gibbsite layers between clay layers, is characterized by the presence of substantially 100% octahedrally coordinated aluminum in the form of gibbsite-like sheet polymers.

When $AlCl_3.6H_2O$ dissolves in water, it ionizes as follows:

$$Al(H_2O)_6^{+++} + 3Cl^-$$

with most of the $Cl^-$ being ionic. Since such solutions are acidic, then hydrolysis must take place to a substantial degree, particularly in view of the relatively high value of the ratio of ionic charge to ionic radius which characterizes the aluminum ion. The initial hydrolysis step is $$Al(H_2O)_6^{+++} \rightarrow [Al(H_2O)_5OH]^{++} + H^+$$

and the complex ion formed by this hydrolysis is basic. In the usual terminology of such complexes, this hydrolysis product is "$\frac{1}{3}$ basic". Such a species is present in acidic aluminum chloride solutions, since hydrolysis is responsible for the acidity of these solutions.

As a means of better understanding these basic polymers, it is important to differentiate between the basicity of a solution and the basicity of a complex ion in solution. The nature of the polymer species present is dependent on pH, concentration and temperature. Lowering the pH by addition of H+ shifts the hydrolysis reaction to the left, causing a decrease in the average molecular weight of the polymer. It is important to note that the total basicity of the complexes will always be greater than the basicity of the solution per se, because of the factor of hydrolysis. Increasing concentration and higher temperatures favor increased degrees of hydrolysis, leading to larger polymers.

The hydrolysis of cations brings about polymers through a process called olation, which is described by C. L. Rollinson in Chemistry of the Coordination Compounds, Edited by J. C. Bailar, Reinhold Publishing Corporation, New York, 1956, as follows:

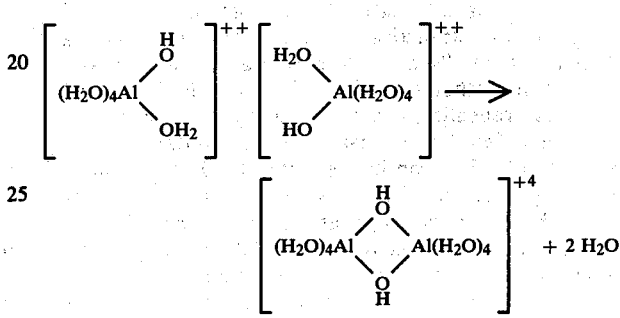

In this process single or double OH bridges can be formed between Al ions. In less acidic solution, larger polymers are formed by the process and the bridging $OH^-$ can be converted to bridging $O^{-2}$, a process called oxolation. Note that a doubly OH bridged complex is a pair of edge-sharing octahedra, and this is the same type of structure found in boehmite, AlOOH, where the $OH^-$ groups at the surface of the layers are each shared between two $AlO_6$ octahedra. In hydrargillite, $Al(OH)_3$, all oxygens are also shared between two $AlO_6$ octahedra.

Some of the prior art methods that have been used to prepare Al polymers include:
(a) Tsutida and Kobayashi: J. Chem. Soc. Japan (Pure Chem. Sec.), 64, 1268 (1943) discloses the reaction of solutions of $AlCl_3.6H_2O$ or HCl with an excess of metallic aluminum;

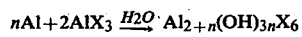

(b) Inove, Osugi and Kanaya: J. Chem. Soc. Japan (Ind. Chem. Sec.), 61, 407 (1958) discloses that more than an equivalent amount of aluminum hydroxide is reacted with an acid;

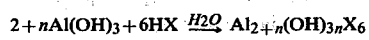

(c) H. W. Kohlschuter et al.: Z. Anorg. Allgem. Chem., 248, 319 (1941) describes a method wherein alkali is added to an aluminum salt solution;

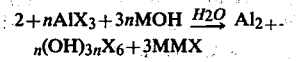

(d) T. G. Owe Berg: Z. Anorg. Allgem. Chem., 269, 213 (1952) discloses a procedure wherein an aqueous solution of $AlX_3$ is passed through an ion exchange column in $OH^-$ form, and (e) R. Brun: German Pat. No. 1,102,713 describes extended heating at ~150° C. of salts such as AlCl$_3$.6H$_2$O.

The inorganic aluminum polymers used in the practice of the present invention are visualized as having the general formula:

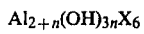

$$Al_{2+n}(OH)_{3n}X_6$$

wherein n has a value of about 4 to 12; and X is usually Cl, Br, and/or NO$_3$. These inorganic metal polymers are believed to have an average molecular weight of from about 300 to 3,000.

In addition to the above described aluminum complex polymers, polymeric cationic hydroxy complexes of metals such as zirconium, titanium, and mixtures thereof may be used. Preparation and description of zirconium complexes are described in:

(1) A. Clearfield and P. A. Vaughn, Acta Cryst. 9, 555 (1956);
(2) A. N. Ermakov, I. N. Marov, and V. K. Belyaeva, Zh. Neorgan. Khim. 8 (7), 1623 (1963).
(3) G. M. Muha and P. A. Vaughan, J. Chem. Phys. 33, 194–9, (1960).

It is also contemplated that copolymers of the above noted metal complexes with silica and magnesium may be used. Furthermore, it is contemplated that the hydrated or dehydrated metal complex treated smectite clays may be post treated with solutions of silicate, magnesium, and phosphate ions to obtain more stable and attrition resistant compositions.

The catalytic and adsorbent characteristics of the interlayered smectite clays of the present invention may be modified by ion exchange with a wide variation of cations including hydrogen, ammonium, and metals of Groups IB through VIII of the periodic table. In particular catalytic cracking and hydrocracking catalysts which contain rare earth, cobalt, molybdenum, nickel, tungsten, and/or noble metal ions are active for the catalytic conversion of hydrocarbons.

Figure 2:
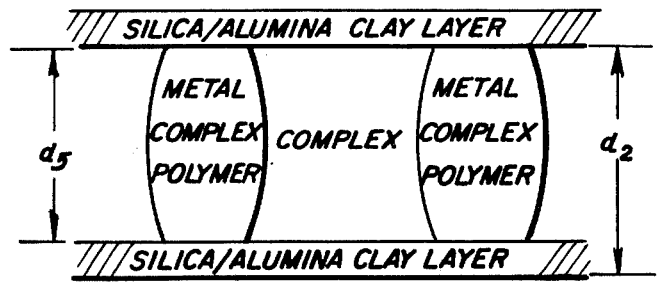
FIG. 2 is a cross-sectional view of the clay of FIG. 1 which has been treated with a polymeric cationic hydroxy metal complex to form a pillared interlayer between the clay layers.
Figure 3:
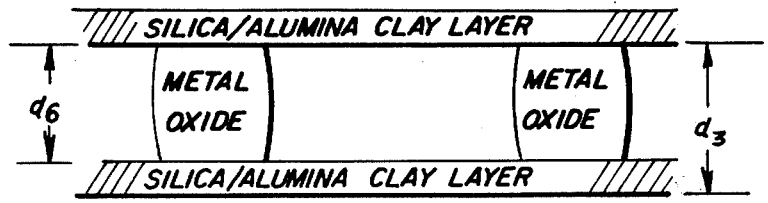
FIG. 3 represents the composition of FIG. 2 which has been calcined to convert the interlayered polymeric complex into "pillars" of stable inorganic oxide.

Referring to the drawing, FIG. 1 represents a typical smectite wherein the layers or platelets have a repeat distance d$_1$ of about 9 to 12 Å depending on the degree of hydration. As shown in FIG. 2, smectites which have been treated with metal complex polymers in accordance with the teachings of the present invention, have an increased repeat distance of d$_2$ of from about 16 to about 24 Å. In FIG. 3, a platelet repeat distance d$_3$ which is less than d$_2$ is shown in exaggerated form. The repeat distance d$_3$, which is established when the pillared metal complex polymer inserted between the platelets is decomposed by calcination to temperatures of about 200° to 700° C., is found in practice to be substantially the same as d$_2$, with only minor shrinkage of the pillared layer occurring to the extent of less than 0.5 Å in most cases. All the distances d$_1$, d$_2$ and d$_3$ (layer repeat distances) are readily obtained directly from the X-ray diffraction patterns of the various products, and represent the first-order basal reflection parameter (i.e. 001). The "interlayer distances" are obtained by subtracting the thickness (about 9 Å) of the clay layer from the basal spacing obtained by X-ray diffraction, i.e. d$_4$=d$_1$−9; d$_5$=d$_2$−9; and d$_6$=d$_3$−9.

Recent research on the clay minerals has shown that within a given clay structure the layers are not uniform, but form a heterogeneous chemical mixture in which the exact composition of one layer may be somewhat different from that of an adjacent layer. This would be expected to result in slight variations in charge between layers, and therefore, slight differences in the amount of polymer exchanged in different layers. As the size of the polymer is the controlling factor in setting the interlayer distance, charge heterogeneity on the layers would only effect the number of polymer species between the layers (i.e. the number of resultant pillars, not their size).

In general, the calcined products of our invention will have an interlayer spacing of about 6 to 16 Å, a nitrogen BET surface area of about 150 to 600 m$^2$/g, and a nitrogen pore volume of about 0.1 to about 0.6 cc/g. Furthermore, our novel pillared interlayered clay compositions possess a substantial internal micropore structure which is characterized by a pore-size distirbution in which more than 50%, and in many cases more than 75% of the surface area is located in pores less than 30 Å in diameter as determined by conventional nitrogen pore size distribution (PSD) adsorbtion measurements. The conventional prior art gibbsite-like interlayered clay products (synthetic chlorites) possess no substantial surface area in pores less than 30 Å in diameter.

Our interlayer products are useful as adsorbents and catalytic supports. Furthermore, it is contemplated that our interlayered clay products may be combined with other inorganic oxide adsorbents and catalysts such as silica, alumina, silica-magnesia, silica-alumina hydrogel, and natural or synthetic zeolites, and clays. Our products are particularly useful in the preparation of catalysts which contain active/stabilizing metals such as platinum, palladium, cobalt, molybdenum, nickel, tungsten, rare-earths and so forth, as well as matrix components such as silica, aluminum and silica-alumina hydrogel. These catalysts are used in conventional petroleum conversion processes such as catalytic cracking, hydrocracking, hydrotreating, isomerization and reforming catalysts; and as molecular sieve adsorbents.

Having described the basic aspects of our invention, the following specific examples are given to illustrate preferred specific embodiments.

EXAMPLE 1

A clay slurry was prepared from the natural clay product designated Volclay 200 by American Colloid Co. A total of 32,000 ml. of a clay slurry containing 2.7 percent solids and an aluminum chlorohydroxide solution, prepared to contain 50 weight percent of the salt, and 1,110 grams of this solution was added. The resulting mixture was aged for one half-hour with agitation and the temperature was increased to 160°. The slurry was aged for ½ hour at this temperature, the product was filtered, washed once with 16 gallons of hot deionized water, reslurried in deionized water and spray dried. The properties of the product are set out in Table I.

EXAMPLE 2

A total of 31.7 gallons of the less than or equal to 2 micron sized particles of the natural clay product designated Volclay 200 by American Colloid Corporation was prepared by centrifugation. A 50 weight percent solution of aluminum chlorohydroxide was prepared and 6,920 grams of the resulting solution was added to the clay slurry. The slurry was aged for ½ hour at 160° F. and filtered on a belt filter. The filter cake was reslurried in deionized water; refiltered and again reslurried in deionized water and spray dried. The properties of the interlayered clay product are set out in Table I below.

The catalytic activities of these products were determined using the microactivity test described in the article by F. T. Ciapetta et al. in the Oil and Gas Journal of Oct. 16, 1967. The feed stock was a West Texas gas oil boiling in the range of 500° to 800° F. The reactor was operated at a temperature of 920° F., a weight hourly space velocity of 16 and had a catalyst/oil ratio of 3. The product of Example 1 gave a 98.6% conversion, and the product of Example 2 gave a conversion of 82.5%.

Table 1

| Product of | Example I | Example II |
|---|---|---|
| Surface Area (1 hr., 750° F.) | 476.6 m$^2$/gm | 372.5 m$^2$/gm |
| d(001), Å | 19.0 | 19.0 |
| Average Bulk Density lbs./cu. ft. | 0.48 | 0.80 |
| Compacted Density lbs./cu. ft. | 0.71 | 0.98 |
| Attrition | | |
| Davison Index | 4.60 | 8.00 |
| Jersey Index | 2.30 | 1.10 |
| Size Distribution in Percent | | |
| 0-20 microns | 21 | 7 |
| 0-40 microns | 83 | 36 |
| 0-80 microns | 92 | 76 |
| 0-105 microns | 96 | 87 |
| 0-149 microns | 98 | 97 |
| Average Particle Size | 29 | 54 |

| Pore Diameter | Surface Area (m$^2$/gm) | Surface Area (m$^2$/gm) |
|---|---|---|
| >600Å | 1.2 | 0.6 |
| 100-600Å | 4.2 | 1.7 |
| 20-100Å | 109.2 | 101.0 |
| <20Å | 362.0 | 269.2 |
| Total Surface Area | 476.6 | 372.5 |
| Catalytic Activity (% Conversion) | 98.6 | 82.5 |

EXAMPLE 3

One of the problems in encountered in the preparation of these slurries where the particle size is equal to or less than 2 microns is the tendency to loose part of the product through the filter. To combat this problem a flocculating agent was added to the clay slurry.

A batch of interlayered clay was prepared in Example 1. Varying amounts of a high molecular weight GUAR designated polymer 7050-B by Stein, Hall & Co. were added to portions of the clay slurry. Each sample was filtered on both a coarse (2-3 cubic feet/minute) and a fine (1 cfm) filter cloth. Results from the 0.5 to 10 grams polymer/100 grams clay indicated thickening at all levels, but 1 to 3 grams/100 grams appeared to yield the clearest filtrates. When slurries were prepared without a flocculating agent, a considerable amount of product was lost through the coarse filter cloth.

The flocculations can also be affected by an addition of low levels of sodium silicate (0.5 grams SiO$_2$/100 grams clay). There was little loss in product surface area with this treatment. Other flocculating agents of the anionic or neutral type would be equally effective.

EXAMPLE 4

This example illustrates the use of calcium bentonite as the raw material in our novel process.

A slurry of particles having a particle size of equal to or less than 2 microns of calcium bentonite furnished by American Colloid Corporation was prepared by centrifugation. A total of 26.7 grams (dry basis) of clay from this slurry was diluted to 5.4 l. and 38.0 grams of a 50 weight percent aluminum chlorhydroxide solution was added. The slurry was aged for ½ hour at 25° C., and the pH was then adjusted to 2.0 with a 3.75% hydrochloric acid solution. The slurry was then aged for ½ hour at a temperature of 160° F., filtered, washed with 2.7 l. of hot deionized water and oven dried. The product recovered had a surface area of 350 m$^2$/gm. and a (001) basal spacing of 17.5 Å.

EXAMPLE 5

This example illustrates the use of beidellite clay as a raw material.

A slurry was prepared from 15 grams (dry basis) of beidellite clay from Taiwan having a particle size of equal to or less than 2 microns. The particles having a particle size of equal to or less than 2 microns were recovered by centrifugation. A total of 15 grams (dry basis) of the clay was diluted to 3 liters and 15.1 grams of a 50 weight percent aluminum chlorhydroxide solution was added. The resulting slurry was aged for a period of ½ hour. The pH was adjusted to 2.0 with 3.75 percent hydrochloric acid solution. The temperature was increased to 160° F. and the slurry was aged at this temperature for a period of ½ hour. The slurry was filtered, washed with 1 liter of hot deionized water and oven dried. The surface area of the product was 307 m$^2$/gm. and the (001) basal spacing was 18.0 Å.

EXAMPLE 6

This example illustrates a method of utilizing a beneficiated montmorillonite without the necessity of separating the particles that have a particle size equal to or less than 2 microns. The use of such readily available commercial product greatly reduces the pre-processing needed to prepare the materials of this invention. A 25 gram (dry basis) sample of a high purity air-floated Wyoming bentonite furnished by American Colloid Company (#325 Bentonite) was slurried in a blendor with 1 liter of deionized water for ½ minute. A total of 21.5 grams of a 50 percent aluminum chlorohydroxide solution was added and the slurry was aged for ½ hour at 150° F. The product was filtered, washed with 1 liter of hot deionized water, and oven dried at 110° C. The surface area of this product was 308 m$^2$/gm.

EXAMPLE 7

This example illustrates the product distribution of a typical product prepared from the product described in Examples 1 and 2. The catalytic activity of the product was determined using the micro-activity test described in the article by F. G. Ciapetta et al. in the Oil and Gas Journal of Oct. 16, 1967. The feed stock was a West Texas gas oil boiling in the range of 500° to 800° F. The reactor was operated at a temperature of 920° F., a weight hourly space velocity of 16 and a catalyst/oil ratio of 3. The test was carried out after the catalysts had been exposed to a temperature of 1000° F. for a period of 3 hours. The data collected in this run is set out in Table II below.

Table II

| Conversion | Pillared Interlayered Clay prepared from Volclay 200 |
|---|---|
| Conv.,* V % | 77.3 |
| $H_2$,** W % | .27 |
| $C_1$, W % | .90 |
| $C_2=$, W % | .71 |
| $C_2$, W % | .94 |
| Total $C_3$, W % | 5.7 |
| Total Dry Gas, W % | 8.5 |
| $C_3=$, V % | 5.4 |
| $C_3$, V % | 4.2 |
| Total $C_3$, V % | 9.6 |
| $C_4=$, V % | 2.6 |
| iso - $C_4$, V % | 8.0 |
| normal - $C_4$, V % | 1.7 |
| Total $C_4$, V % | 12.3 |
| $C_4$ + gasoline., V % | 66.9 |
| $C_5$ + gasoline, V % | 54.6 |
| Coke on cat., W % | 4.5 |
| Coke - Total feed, W % | 12.8 |

*V % = Volume percent
**W % = Weight percent

EXAMPLE 8

It has been found that if the clay was added to the aluminum chlorohydroxide solution a larger solids concentration could be affected. Such additions to the aluminum chlorohydroxide solution may be as high as about 40 weight percent clay without encountering problems in mixing, pumping, or handling the clay in the fluid state. This greatly enhances the economy of the process in that much larger volumes of the product can be obtained and processed in a given time for a given sized system. The addition of clay to water followed by aluminum chlorhydroxide addition does not allow high solids levels to be achieved. The former process is presumably achieved because the polymer is instantaneously intercallated by the clay as the clay is added, and so inhibits dispersion of the clay platelets and subsequent formation of a clay-water gel.

A further advantage is that high solids cut down the use of energy in the drying step.

In an illustration of this, a total of 2,470 grams of a 50 weight percent of aluminum chlorohydroxide solution was diluted to 22.7 liters. A total of 5,320 grams (5,072 gram dry basis) of bentonite was added to the slurry. The slurry was aged at 150° F. for a period of 1 hour and spray dried. The solids concentration of the product fed to the spray drier was approximately 20 percent, the product recovered had a surface area of 273 $m^2$/gm and a lattice d spacing (001) of 17.9.

EXAMPLE 9

In this example a slurry containing 15.9 percent solids was prepared by diluting 2,720 grams of aluminum chlorohydroxide to 6 gallons and 5000 grams (dry basis) of the clay was added to this slurry. The slurry was agitated and aged ½ hour at 150° F., filtered, and washed on the filter with 6 gallons of hot deionized water. The product was reslurried and spray dried. The surface area of the product recovered a 316 $m^2$/gm and the d spacing (001) was 18 Å.

EXAMPLE 10

In this example a slurry containing a 35 percent total solids was prepared by addition of 125 grams (dry basis) #325 Bentonite clay (American Colloid Co.) to a solution containing 65.2 grams of the aluminum polymer in a total volume of 250 ml. This slurry was aged 1 hour at 150° F., filtered, washed with ½ l. hot deionized water and dried. The product surface area was 263 $m^2$/gm. and the (001) d spacing was 17.6 Å.

EXAMPLE 11

In this example a less basic Al polymer is used to interlayer the smectite. Ordinary aluminum chlorhydroxide (chlorhydrol) contains 5 $OH^-/2$ $Al^{+3}$, and is 5/6 basic. 10 gms. dry basis of $\leq 2.0\mu$ Volclay 200 (American Colloid Co.) as a slurry was diluted to 1.0 l., and 9.30 gms. of a 2/3 basic Al polymer (i.e., 4 $OH^-/2$ $Al^{+3}$) solution containing 19.2% $Al_2O_3$ was added. This polymer solution was prepared by refluxing an $AlCl_3.6H_2O$ solution in the presence of excess aluminum metal until pH 2.8 was reached. The above slurry was hot aged ½ hour at 150° F., filtered, washed 2× with ½ l. hot deionized water and oven dried. The interlayered product had a surface area of 286 $m^2$/gm. and a basal spacing of 17.1 Å.

EXAMPLE 12

This example indicates that smectites can be interlayered with Al polymer prepared from dehydrated $AlCl_3.6H_2O$. 9.1 gms. of $AlCl_3.6H_2O$ was weighed in an evaporating dish, the dish placed in a muffle furnace set at 325° F. for one hour and the temperature then increased to 500° F. The sample was withdrawn from the furnace after a 45% weight loss. The salt was then added to 200 ml. of deionized water, 12.5 gms. dry basis of #325 Bentonite (American Colloid Co.) was added, the slurry hot aged 1 hour at 150° F., filtered, washed 2× with 250 ml. hot deionized water and dried at 250° F. This sample had a surface area of 281 $m^2$/gm. and a basal spacing of 17.7 Å.

EXAMPLE 13

In this example a mixture of $AlCl_3.6H_2O$ and $MgCl_2.6H_2O$ are dried at 250° F. for 18 hours to a 48% weight loss to produce a mixed Al-Mg polymer for interlayering smectite. 7.6 gms. $AlCl_3.6H_2O$ and 2.54 gms. $MgCl_2.H_2O$ were dissolved in 25 ml. deionized water and then dried at 250° F. for 18 hours. The dried salt mixture was dissolved in 250 ml. deionized water, 12.5 gms. dry basis #325 Bentonite added, the slurry hot aged 1 hour at 150° F., filtered, washed 2× with 250 ml. hot deionized water and dried at 250° F. The interlayered clay product had a surface area of 254 $m^2$/gm. and a basal spacing of 17.7 Å.

EXAMPLE 14

This example shows how a well interlayered smectite can be produced from $ZrOCl_2.4H_2O$ dried at 500° F. 11 gms. of $ZrOCl_2.4H_2O$ was dried at 500° F. to a 11% weight loss, dissolved in 200 ml. deionized water, 12.5 gms. dry basis #325 Bentonite added, the slurry hot aged 1 hour at 150° F., filtered, washed 2× with 200 ml. hot deionized water and dried at 250° F. The interlayered clay had a surface area of 262 $m^2$/gm. and a basal spacing of 18.8 Å.

EXAMPLE 15

This example shows that interlayering of smectite can be accomplished at elevated temperature and pressure. 13.6 gms. chlorhydrol (Reheis Chemical Co.) was diluted to 200 ml. with deionized water, 25 gms. dry basis #325 Bentonite added and the slurry boiled 1 hour. 20% of the above slurry was added to a Hoke high pressure cylinder and aged 1½ hours at 150° C. The interlayered clay product was then filtered, washed 2× with 250 ml. hot deionized water and oven dried. The product had a surface area of 279 m²/gm. and a basal spacing of 17.7 Å.

EXAMPLE 16

This example indicates that interlayered smectites prepared by chlorhydrol+$Mg^{+2}$ coexchange are more hydrothermally stable than those prepared with chlorhydrol exchange alone. 54.4 gms. chlorhydrol was diluted to 1.6 l. and then 400 ml. of a solution containing 40.8 gms. $MgCl_2.6H_2O$ was added and the mixture aged 3 days at room temperature. 100 gms. dry basis of #325 Bentonite was added, the slurry hot aged 1 hour at 160° F., filtered, washed 2× with 1.0 l. hot deionized water and oven dried. As indicated below, this preparation maintained a greater degree of surface area after a 6 hour, 1400° F., 1 atmosphere steam treatment than smectite interlayered with chlorhydrol alone.

| Interlayering Species | Surface Area | |
|---|---|---|
| | 1°–1000° F. | 6°–1400° F., 1 Atm. |
| Chlorhydrol | 270 | 20 |
| Chlorhydrol + $Mg^{+a}$ | 310 | 104 |

EXAMPLE 17

This example indicates that refluxed $ZrOCl_2.4H_2O$ solutions are effective in interlayering smectite. 0.33 M $ZrOCl_2.4 H_2O$ was refluxed for 24 hours and then 120 ml. of this solution was diluted to 500 ml., 10 gms. dry basis HPM-20 (American Colloid Co.) added, aged ½ hour at room temperature, filtered, washed 2× with ½ l. hot deionized water and oven dried. The interlayered product had a surface area of 288 m²/gm and a basal spacing of 22.0 Å.

EXAMPLE 18

This example shows that $ZrOCl_2.4 H_2O$ solutions treated with $Na_2CO_3$ can effectively interlayer smectites. 125 gms. $ZrOCl_2.4H_2O$ was dissolved in ½ l. solution. To this solution was added dropwise ½ l. of solution containing 26.5 gms. $Na_2CO_3$. After aging for 24 hours, 50 ml. of the above solution was diluted to ½ l., 10 gms. dry basis HPM-20 added, the slurry hot aged ½ hour at 150° F., filtered, washed 2× with ½ l. hot deionized water and oven dried. The product had a surface area of 309 m²/gm. and a basal spacing of 17.4 Å.

EXAMPLE 19

This example shows how $CO_2$ treated $ZrOCl_2.4H_2O$ solutions can effectively interlayer smectite. 125 gms. of $ZrOCl_2.4 H_2O$ was dissolved in 1,000 ml. deionized water. $CO_2$ (gas) was bubbled through the solution for 2 hours, and the solution aged 24 hours at room temperature. 50 ml. of this solution was then diluted to ½ l., 10 gms. dry basis HPM-20 (American Colloid Co.) was added, the slurry hot aged ½ hour at 150° F., filtered, washed 2× with ½ l. hot deionized water and oven dried. The interlayered clay had a surface area of 279 m²/gm. and a basal spacing of 16.8 Å.

EXAMPLE 20

This example shows that diluted chlorhydrol when refluxed, gives interlayered smectites with improved hydrothermal stability relative to non-refluxed chlorhydrol. 217 gms. chlorhydrol was diluted to 1.0 l., yielding a solution which is 0.5 M as $Al_2O_3$. This solution was refluxed for 96 hours. 87.6 ml. of this solution was diluted to 400 ml., 25 gms. dry basis #325 Bentonite added, the slurry boiled 1 hour, filtered, washed 2× with ½ l. hot deionized water and oven dried. As indicated below, this preparation had a greater retention of surface area than an interlayered clay prepared with ordinary chorhydrol.

| Interlayering Species | Surface Area | |
|---|---|---|
| | 1°–1000° F. | 6°–1400° F., 1 Atm. |
| Chlorhydrol | 270 | 20 |
| Refluxed diluted chlorhydrol | 271 | 82 |

EXAMPLE 21

This example shows that treatment with $SiO_3^{-2}$ of either diluted refluxed chlorhydrol or ordinary chlorhydrol results in a substantial improvement of the interlayered product. 43.8 ml. of diluted (0.5 M in $Al_2O_3$) refluxed (48 hours) chlorhydrol was diluted further to 500 ml. 1.26 gms. of $Na_2SiO_3$ solution (containing 28.5% $SiO_2$ and 8.0% $Na_2O$) diluted to 100 ml. was added to the refluxed chlorhydrol solution. 12.5 gms. dry basis #325 Bentonite was added, the slurry boiled 1 hour, filtered, washed 2× with ½ l. hot deionized water and oven dried.

Silicating ordinary chlorhydrol also substantially improves the hydrothermal stability of the interlayered clay. 8.5 gms. chlorhydrol was diluted to 900 ml. and then 1.26 gms. of $Na_2SiO_3$ solution (28.5% $SiO_2$, 8.0% $Na_2O$) diluted to 100 ml. was added to the dilute chlorhydrol solution. After aging overnight at room temperature, 12.5 gms. dry basis #325 Bentonite was added, hot aged 1 hour at 150° F., filtered, washed 2× with ½ l. hot deionized water and oven dried.

Summarized below is a comparison of the hydrothermal stability of both of the above interlayered clays with ordinary chlorhydrol interlayered clay.

| Interlayering Species | Surface Area | |
|---|---|---|
| | 1–100° F. | 6–1400° F., 1 Atm. |
| Chlorhydrol | 270 | 20 |
| Chlorhydrol + $SiO_3^{-2}$ | 294 | 129 |
| Refluxed diluted chlorhydrol + $SiO_3^{-2}$ | 353 | 165 |

EXAMPLE 22

This example illustrates the use of the pillared interlayered clays as sorbents for organic molecules.

202 gms of a ≦2.0μ slurry of Volclay 200 (American Colloid Co.) which corresponds to 4.25 gms. (Dry Basis) clay was added to 400 ml. of solution containing 7.6 gms. of aluminum chlorhydroxide solution (Reheis Chemical Co.). The slurry was aged 1 hour with agitation, centrifuged, reslurried in deionized water and recentrifuged. The product was then reslurried in a second solution of 7.6 gms. aluminum chlorhydroxide diluted to 1.0 l. After aging for 1 hour the slurry was centrifuged, reslurried in deionized water, recentrifuged and oven dried overnight at 250° F. The sample was then ground and tested for n-butane and iso-butane capacity after several batches were prepared. This sample had an n-butane capacity of 7.74% and an iso-butane capacity of 7.13%. The surface area of this sample was 393 m²/gm. and the basal spacing was 17.7 Å.

EXAMPLE 23

This example shows the usefulness of pillared interlayered clays as hydrocracking catalyst base. 2,720 gms. of chlorhydrol was diluted to 6 gallons and 5,000 gms. dry basis #325 Bentonite was added with vigorous agitation. The slurry was hot aged ½ hour at 150° F., filtered and washed 1× on the filter with 6 gallons of hot water. The filter cake was reslurried to 15.9% solids and spray dried. The product surface area was 316 m²/gm. and the basal spacing was 18.0 Å. A portion of this material was exchanged with 0.5% Pd, blended at a ratio of 9 parts interlayered clay/1 part $Al_2O_3$, reduced (2 hours at 500° F., 12 hours at 700° F. in 71 liters/hour flowing $H_2$) and then calcined 3 hours at 1000° F. The hydrocracking test was run at 1 LHSV, 1500 psig and 8000 SCF/B $H_2$. The interlayered clay hydrocracking catalyst gave 16% conversion of 675° F., compared to 6% conversion for a 0.5 W% Pd impregnated 28% $Al_2O_3$, 72% $SiO_2$ catalyst.

EXAMPLE 24

This example shows the general usefulness of interlayered clays for water sorption. The same interlayered clay sample (without Pd) as described in example 24 was used for the water sorption measurements. The sample was calcined 1 hour at 1000° F. prior to the test. The results, given as % water sorption with varying relative humidity (RH), indicate substantial ability to sorb water.

| TV @ 1750° F. | 4.85 |
| Ads. 10% RH | 2.56 |
| Ads. 20% RH | 4.78 |
| Ads. 35% RH | 9.30 |
| Ads. 60% RH | 12.48 |
| Ads. 100% RH | 19.76 |

The capacity as a dehydrating agent is comparable to silica gels and zeolites.

We claim:

1. An interlayered smectite clay product which includes an inorganic oxide selected from the group consisting of alumina, zirconia and mixtures thereof between the layers thereof, and which possesses an interlayer distance of from about 6 to 16 Å, said interlayered clay having greater than about 50 percent of its surface area in pores of less than 30 Å in diameter.

2. The product of claim 1 wherein said inorganic oxide is alumina.

3. The product of claim 1 wherein said inorganic oxide is zirconia.

4. The product of claim 1 wherein said inorganic oxide is silica and alumina.

5. The product of claim 1 wherein said inorganic oxide is alumina and magnesia.

6. The product of claim 1 wherein the smectite is selected from the group consisting of hectorite, chlorite, bentonite, montmorillonite, beidellite, and mixtures thereof.

7. The smectite of claim 1 exchanged with cations selected from the group consisting of hydrogen, ammonium, Group IB to VIII of the periodic table, and mixtures thereof.

8. A process for preparing an interlayered smectite which comprises:
   (a) reacting a smectite with a mixture of a polymeric cationic hydroxy inorganic metal complex selected from the group comprising aluminum and zirconium complexes and mixtures thereof and water to obtain a smectite having greater than 50 percent of its surface area in pores of less than 30 Å in diameter after dehydration; and
   (b) separating the interlayered smectite from the mixture.

9. The process of claim 8 wherein said mixture is reacted at a temperature of 5° to 200° C. from a period of 0.1 to 4 hours.

10. The process of claim 8 wherein said smectite is selected from the group consisting of hectorite, chlorite, bentonite, montmorillonite, beidellite and mixtures thereof.

11. The process of claim 8 wherein said metal complex has the formula $Al_{2+n}(OH)_{3n}X_6$ wherein n has the value of 4 to 12 and wherein up to about 10% of the aluminum is tetrahedrally coordinated; and X is selected from the group consisting of Cl, Br, $NO_3$ and $CO_3$.

12. The process of claim 8 wherein said metal complex is aluminum chlorhydrol.

13. The process of claim 8 wherein said metal complex contains titanium.

14. The process of claim 8 wherein said interlayered smectite is heated at a temperature of 200° to 700° C.

15. The process of claim 8 wherein from about 0.05 to 2.0 parts by weight of said metal complex is mixed with each part by weight of said smectite.

16. A hydrocarbon conversion catalyst comprising the interlayered smectite of claim 7.

17. A hydrocracking catalyst comprising the interlayered smectite of claim 1, and a metal selected from the group consisting of Group VIII noble metals, Ni, Co, W and Mo.

18. An adsorbent composition comprising the interlayered smectite of claim 1 formed into particles having Tyler mesh sizes of from about 4 to 400.

19. A hydrocarbon conversion catalyst comprising the interlayered clay of claim 1, admixed with a crystalline aluminosilicate zeolite which comprises a member selected from the group consisting of inorganic oxides and a matrix clay, and mixtures thereof.

20. The method of claim 8 wherein the metal complex is an aluminum complex.

21. The method of claim 8 wherein the metal complex is a zirconium complex.

* * * * *